Sept. 4, 1934.  W. D. ARCHEA  1,972,823
GEAR CUTTING MACHINE
Filed Aug. 17, 1931  6 Sheets-Sheet 1

Inventor
WALTER D. ARCHEA
By
Parsons
Attorney

Sept. 4, 1934.  W. D. ARCHEA  1,972,823
GEAR CUTTING MACHINE
Filed Aug. 17, 1931  6 Sheets-Sheet 5

Inventor
WALTER D. ARCHEA
By
HR Parsons
Attorney

Sept. 4, 1934.  W. D. ARCHEA  1,972,823
GEAR CUTTING MACHINE
Filed Aug. 17, 1931  6 Sheets-Sheet 6
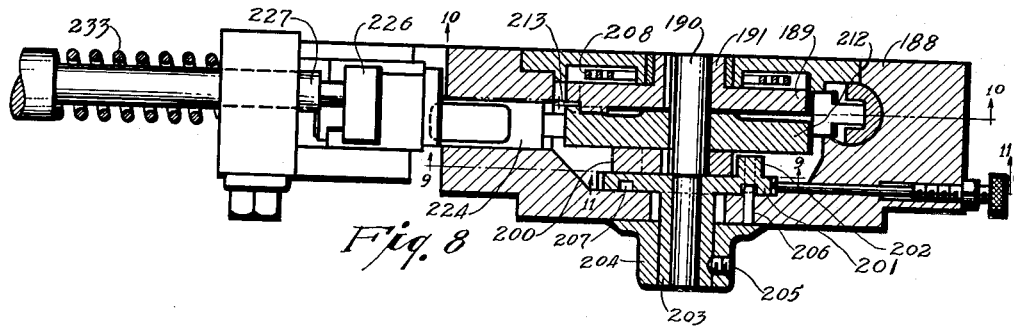
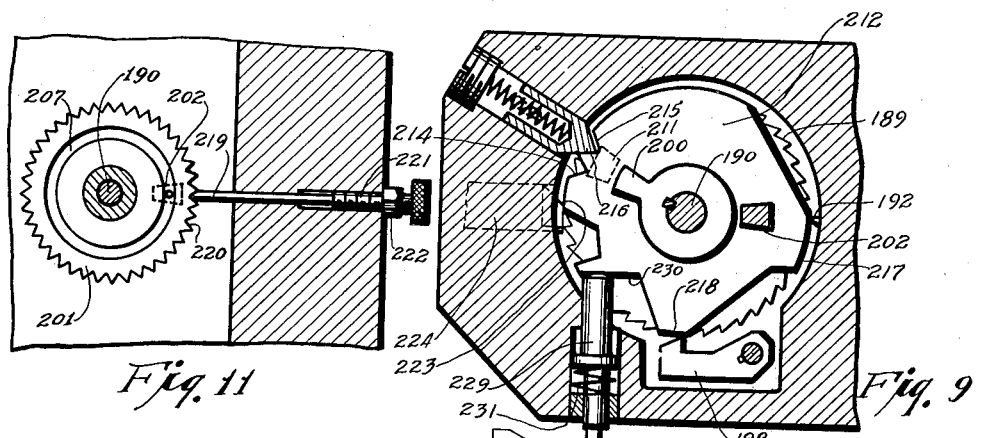
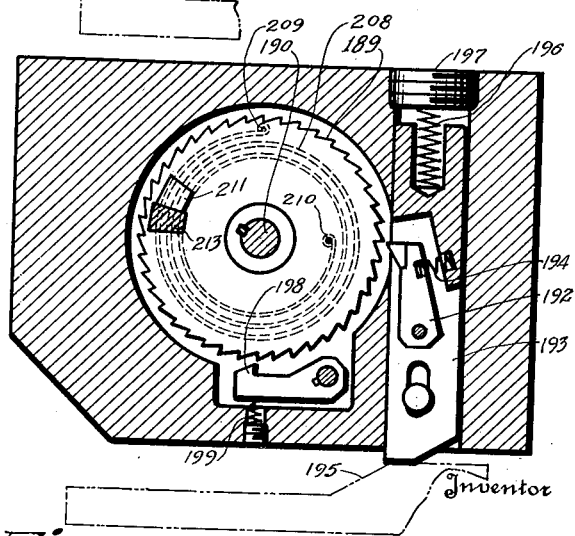
Inventor
WALTER D. ARCHEA
By H. H. Parsons
Attorney Patented Sept. 4, 1934

1,972,823

UNITED STATES PATENT OFFICE 1,972,823

GEAR CUTTING MACHINE

Walter D. Archea, Cincinnati, Ohio, assignor to The Cincinnati Milling Machine Company, Cincinnati, Ohio, a corporation of Ohio Application August 17, 1931, Serial No. 557,534

28 Claims. (Cl. 90—3)

This invention relates to improvements in machine tools and more particularly to the mechanism for automatic control of the operation thereof.

One of the principal objects of the present invention is the provision of an improved mechanism for controlling the relative approach and retraction of work and tool when performing milling or other contouring operations on a work piece.

A further object of the invention is the provision of an improved mechanism for insuring the ready relative movement of the parts according to the contour being produced, while at all times maintaining necessary rigidity therebetween to effect maximum desired cutting action.

A further object of the invention is the provision of an improved automatically operating machine which will satisfactorily operate to perform a sequence of tooling operations, as for example the formation of individual gear teeth on a gear blank, and which will discontinue operation at the completion of any predetermined number of cutting movements.

Other objects and advantages of the present invention should be readily apparent by reference to the following specification considered in conjunction with the accompanying drawings illustrative of one embodiment thereof, but it will be understood that any modifications may be made in the specific structural details hereinafter disclosed, within the scope of the appended claims, without departing from or exceeding the spirit of the invention.

Referring to the drawings in which like reference numerals indicate like parts:

Figure 7 is a detail section of the load and fire mechanism for the reversing valve shown in Figure 6.

Figure 8 is a section on the line 8—8 of Figure 1.

Figure 9 is a section on the line 9—9 of Figure 8.

Figure 10 is a section on the line 10—10 of Figure 8.

Figure 11 is a section on the line 11—11 of Figure 8.

Figure 1:
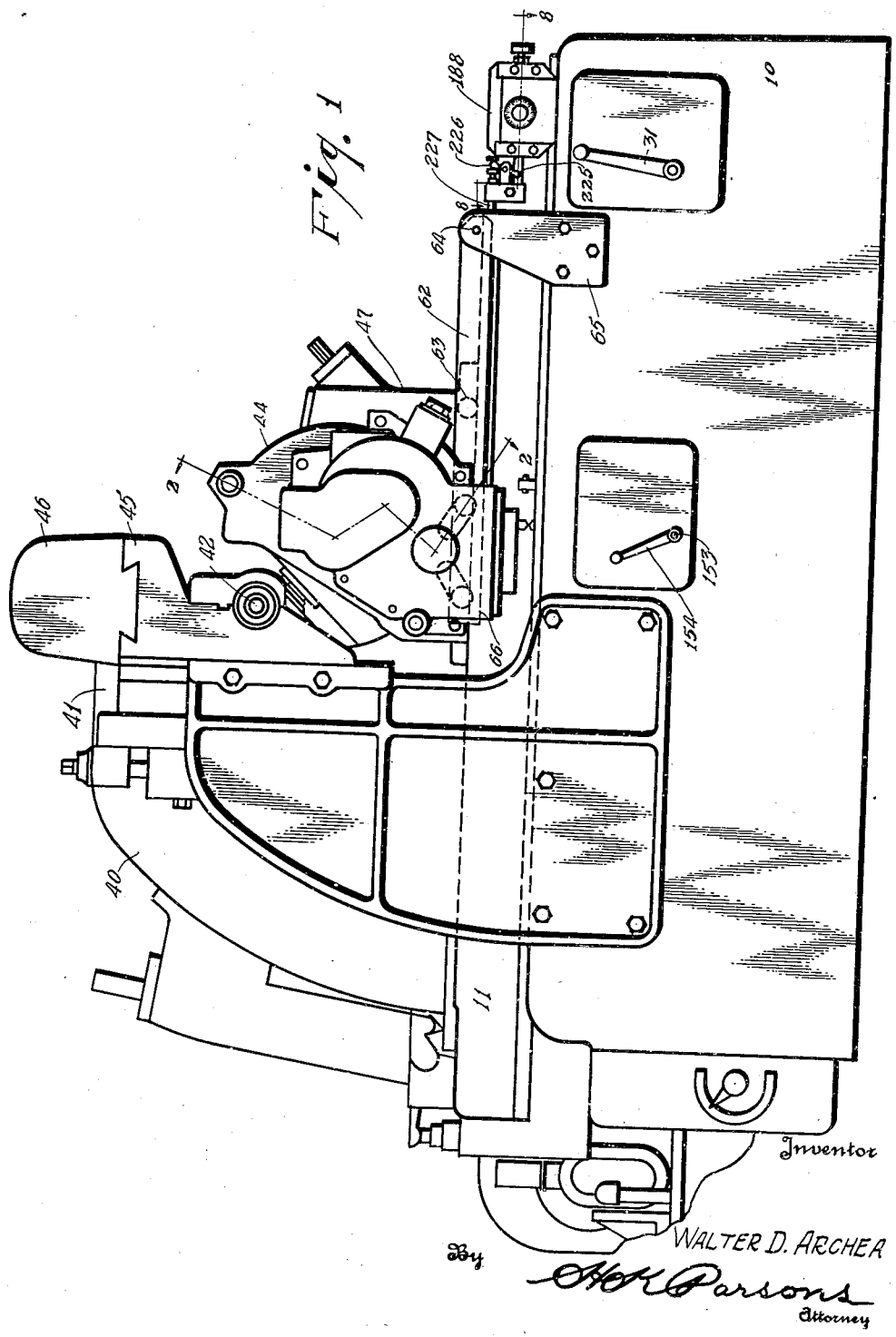
Figure 1 is a front elevation of a machine embodying the principles of this invention.

The reference numeral 10 in Figure 1 of the drawings represents the bed of the machine embodying the principles of this invention and has bodying thereon a table 11 which is reciprocated mounted thereon a table 11 which is reciprocated by hydraulic means on suitable guideways, formed in the upper face of the bed. Any suitable hydraulic circuit may be utilized for effecting this movement, the circuit shown in the application of Nenninger and Ernst, Serial Number 220,721, filed September 15, 1927, being satisfactory for present purposes.

Figure 6:
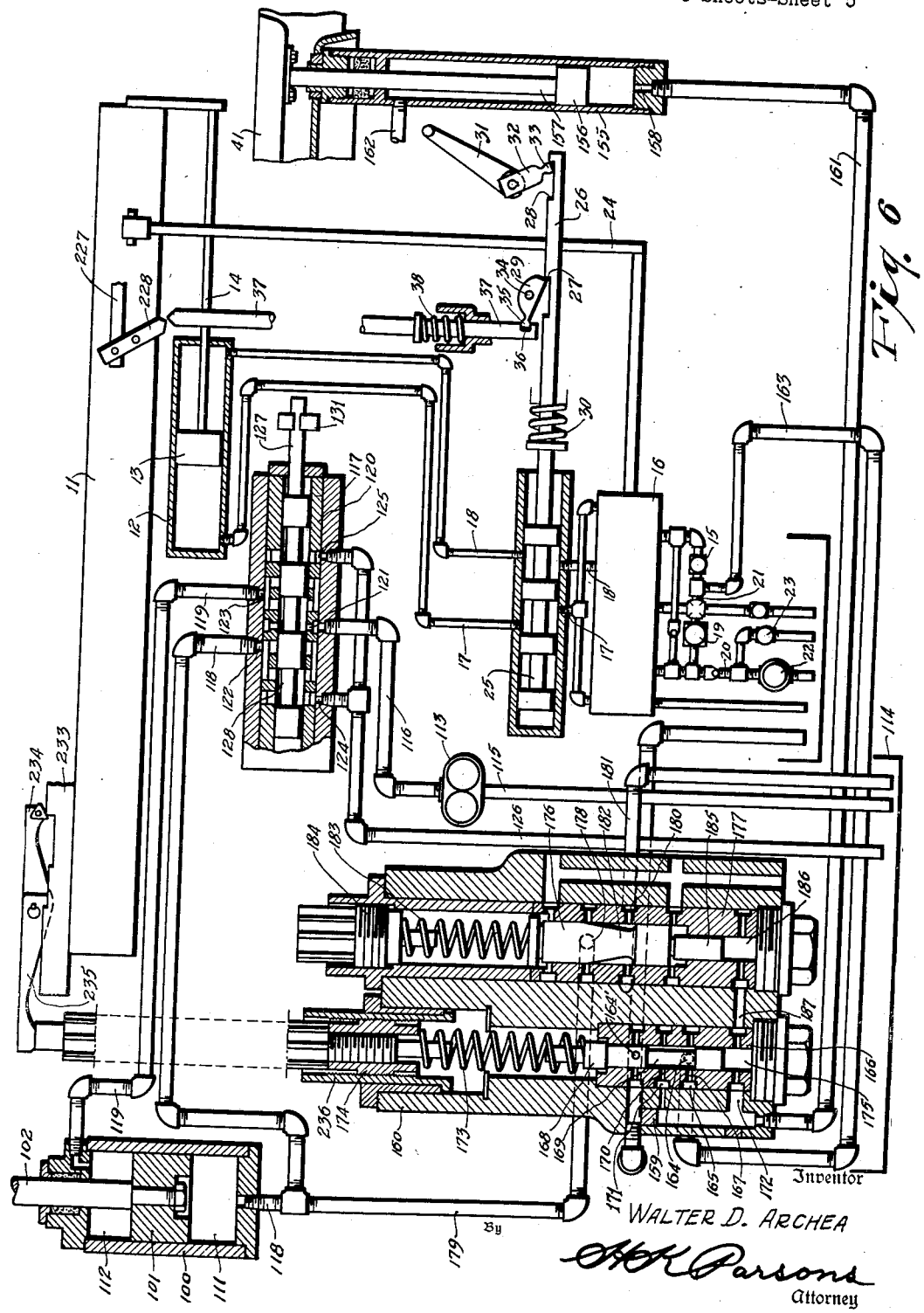
Figure 6 is a diagram of the hydraulic circuit of the spindle carrier elevating mechanism.

To facilitate understanding of this invention the hydraulic circuit is diagrammatically illustrated in Figure 6 and comprises a cylinder 12 in which is reciprocably mounted a piston 13 connected to the table 11 by means of a piston rod 14. Fluid pressure is supplied to the cylinder for effecting feed movements by means of a variable delivery pump 15 which withdraws fluid from one end of the cylinder, as through channel 17, and pumps or forces it into the other end of the cylinder, as through channel 18, resulting in movement of the table to the left. Since the pump is unidirectionally driven, a selector valve 16 is inserted in the circuit between the pump and the cylinder for changing the direction of flow in the channels 17 and 18 thereby reversing the direction of table movement or, in other words, causing it to move to the right, as viewed in Fig. 6. Since the system just described constitutes a closed system, means are provided to compensate for leakage and other losses in the system and comprises a booster pump 19 which receives fluid from a channel 20 and forces it into the high pressure side 21 of the pump 15. The channel 20 is maintained under pressure by a third pump 22 known as a rapid traverse pump; and a relief valve 23 is provided to control or limit the pressure in this line. The selector valve 16 is reciprocable to determine the direction of movement of the table, movement of the valve to the left causing movement of the table to the left and movement to the right causing movement of the table to the right. A vertical control plunger 24, which is dog actuated by suitable dogs carried by the front of the table, determines the position of the valve and thereby the direction of movement of the table.

Since the circuit is designed to give the table a constant reciprocating movement, additional means are provided for stopping the movement when desired. This means includes a stop valve plunger 25 which is inserted in the channels 17 and 18 so that in one position it will short circuit that portion of the two lines coming from the selector valve and close or block off the portion of each of these lines that extends to the cylinder, thus preventing high pressures building up in the pump circuit, while still maintaining the opposite ends of the cylinder filled with oil to obviate any delay in starting again.

The plunger 25 is provided with an extension rod 26 which has two notches, 27 and 28, formed therein, the notch 27 being engaged by a pawl 29 for holding the stop valve to the right against the pressure of the spring 30. The valve is moved to this running position by means of a pivoted lever 31 mounted on the front of the machine, as shown in Figure 1, having an integral arm 32 which is formed with a ball end 33 for engaging the other notch 28. The pawl 29 is pivoted about a fixed pin 34 and has a ball shaped end 35 engaging a slot 36 formed in a vertically reciprocable stop plunger 37. The stop plunger is maintained in an upward position by means of a spring 38. The upward end of this plunger is wedge shaped for engagement by a latch dog, to be described later, which will depress the plunger 37 after a predetermined number of reciprocations of the table to cause disengagement of the pawl 29 from the notch 27 thereby permitting the spring 30 to come into action and move the stop valve to a stop position. To re-start the machine the lever 31 will be manually moved by the operator to move the rod 26 to the right after which the pawl 29 will automatically re-set and hold it in that position.

From the foregoing it should now be apparent that the machine is provided with a hydraulically reciprocated table which will move continuously back and forth in a reciprocating cycle until stopped by movement of the stop valve.

Uprising from the side of the bed 10 is a vertical column 40 having reciprocably mounted thereon a spindle carrier 41. The spindle carrier supports an arbor 42 upon which is mounted a plurality of cutters 43, each one adapted to operate on a separate piece of work carried in the work fixture 44 supported on the table 11. The outboard end of the arbor is journaled in a pendant 45 carried in the end of the overarm 46 projecting from the carrier 41.

Figure 2:
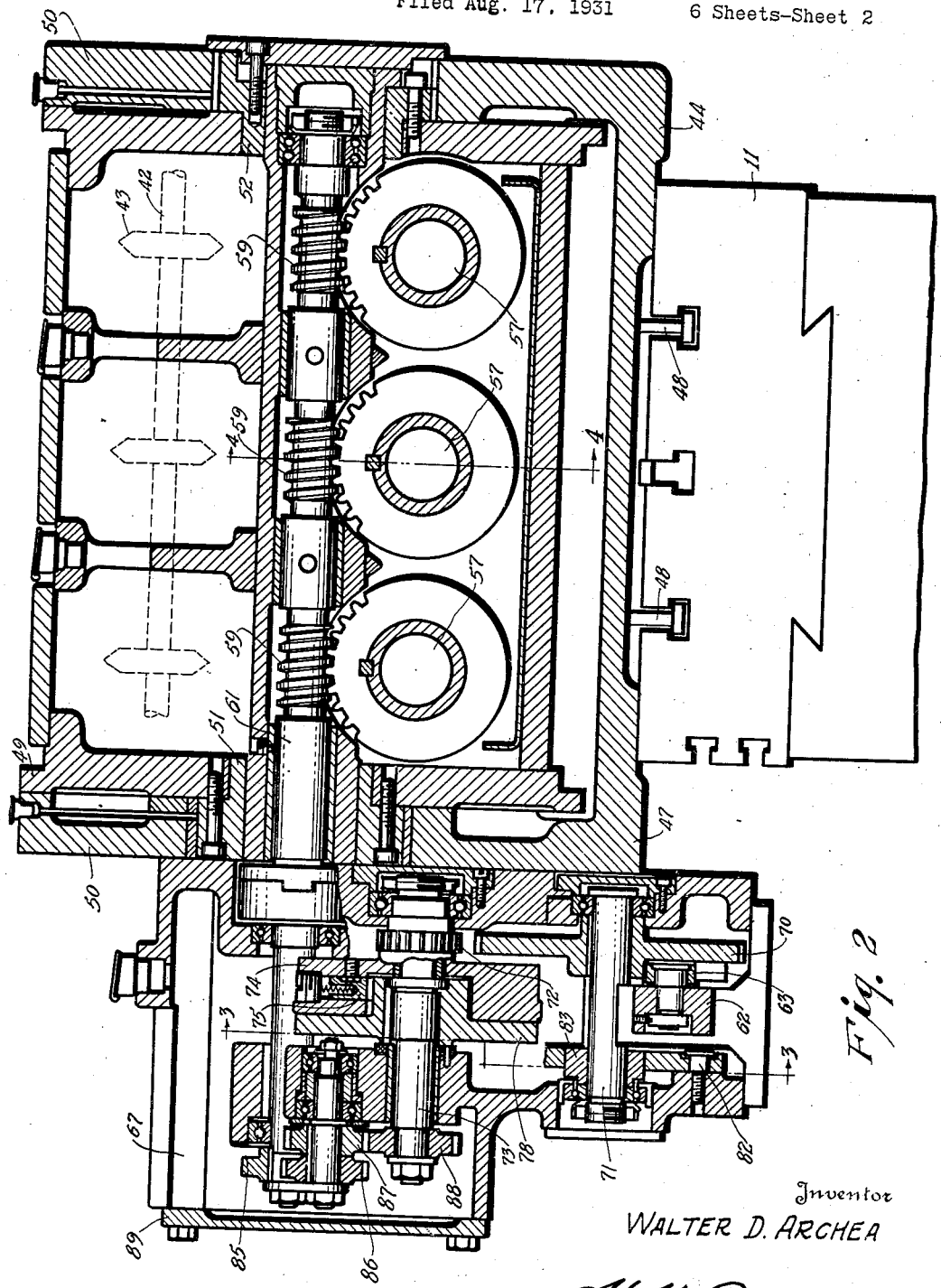
Figure 2 is a section on the line 2—2 of Figure 1.
Figure 4:
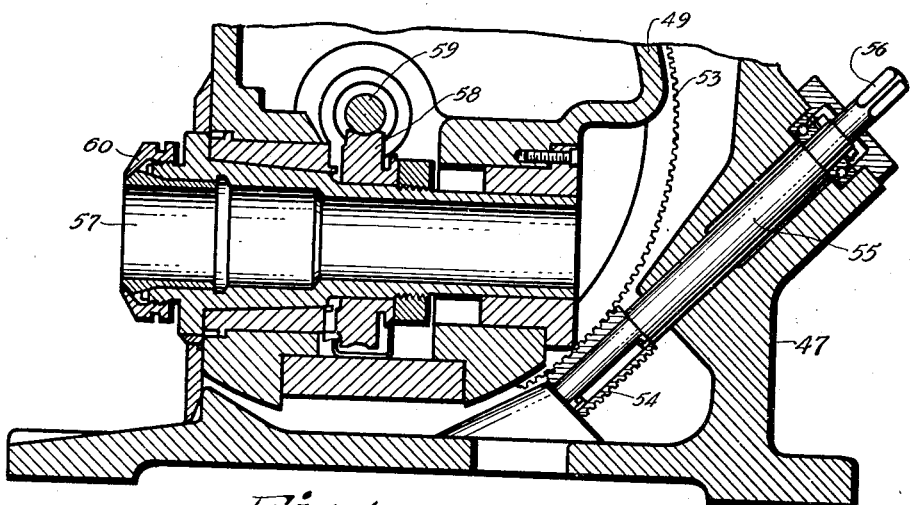
Figure 4 is a section on the line 4—4 of Figure 2.

The work fixture 44, which is shown more particularly in section in Figure 2, comprises a housing 47 which is secured to the top of the table by suitable T-bolts 48. A drum 49 is pivotally mounted between the ends 50 of the housing on bushings 51 and 52, having reduced diameters inserted in the ends of the drum and larger diameters forming a bearing in the ends of the housing. As shown in Figure 4, the exterior of the drum is provided with a gear sector 53 engaged by a worm 54 keyed to the end of a shaft 55 journaled in the housing 47. The end of the shaft 55 is squared, as shown at 56, for receiving an operating handle whereby rotation of the worm 54 will effect rotative adjustment of the drum 49.

The drum has a plurality of work receiving spindles 57 journaled therein, to each of which is attached a worm wheel 58 engaged by a worm 59. Each spindle 57 is provided on the end with a suitable collet 60 for clamping work pieces therein, such as the hubs of bevel gears or the like. As shown in Figure 2, the worms 59 are formed on one shaft 61 which is journaled in the end walls of the drum 49 but capable of independent rotation with respect to the drum. As shown in Figure 4, the worm wheels 58 will rotate about the worms 59 upon rotation of the drum 49 to vary the angle of inclination of the work spindles 57. From the foregoing construction it should be apparent that the drum may be angularly adjusted to present the bevel face of a bevel gear in a horizontal plane to the cutter so that upon reciprocation of the table a complete tooth may be cut. After the forming of one tooth it is necessary to index the work a predetermined amount to cut the next tooth.

This movement is effected by an indexing mechanism comprising a Geneva movement which, through a ratchet mechanism, rotates an index plate, the index plate being coupled with the shaft 61 through change gears. As more particularly shown in Figures 1 and 3, a lever 62 carrying a roller 63 is pivoted at 64 to a bracket 65 bolted to the side of the bed. The free end of the lever is supported and guided in a slot 66 formed in a housing 67 attached to the side of the work holder in such a manner that upon return of the table or, in other words, as the work recedes from the cutter, the roller 63 will engage a radial groove 68 formed in the Geneva plate 69. This plate is formed integral on the side of a gear 70 which is keyed to a shaft 71 journaled in antifriction bearings in the housing 67. This gear meshes with a pinion 72 which is mounted for free rotation on the shaft 73 journaled in the housing 67 parallel to the shaft 71.

Formed integral with the pinion 72 is the disc member 74 carrying the spring pressed pawl 75 which successively engages notches 76 of the ratchet member 77. This member is integral with the index plate 78 which is keyed to the shaft 73. To prevent rotation of the plate 78 the periphery thereof has a plurality of equally spaced locking notches 79 adapted to be successively engaged by a spring pressed locking plunger 80. To effect withdrawal of the locking plunger 80 to permit rotation of the index plate 78 an arm 81 is pivoted at 82 to the side of the housing 67 in such a position that it will engage a cam 83 keyed to the shaft 71.

Figure 3:
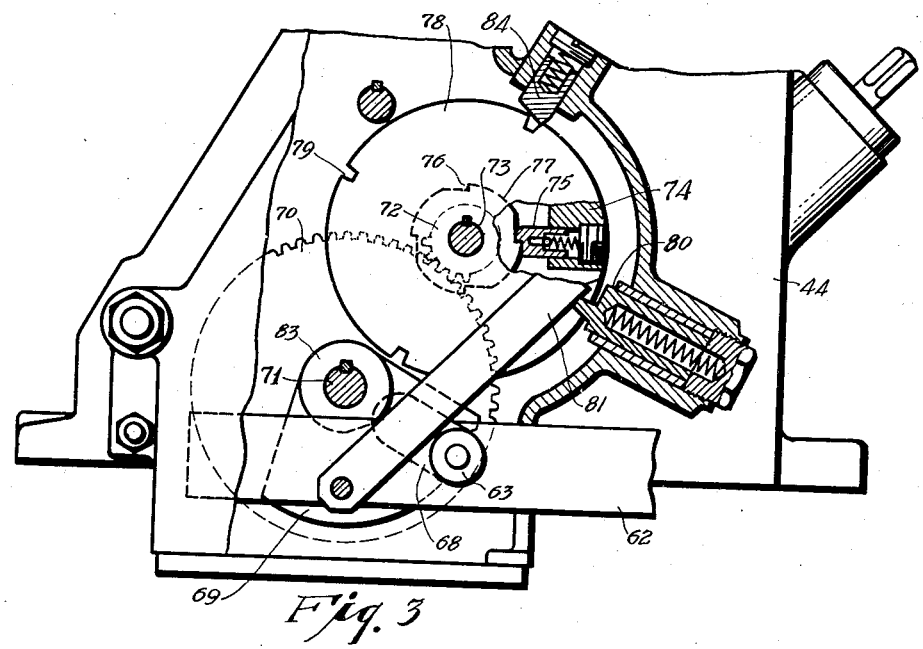
Figure 3 is an end view of the work fixture partly broken away showing the indexing and Geneva mechanism.

The operation of the device is best understood by reference to Figure 3 and, remembering that the member 62 is stationary in that figure and that the remaining parts are moving toward the right, it will be seen that the roller 63 will engage the radial slot 68 causing rotation of the plate 69 and gear 70 in a clockwise direction thereby rotating the pinion 72 and plate 74 in a counter clockwise direction. At the beginning of this movement the cam 83 will bear against the arm 81 acting as a lever to effect withdrawal of the locking plunger 80. After the locking plunger is withdrawn and the plate 74 is moving in a counter clockwise direction, movement of the index plate 78 in the same counter clockwise direction, which might be caused by friction between the plunger 75 and the ratchet 77, is prevented by the spring pressed plunger 84 engaging one of the notches 79.

At the completion of this movement the plunger 75 will be in engagement with the next notch 76 in the ratchet plate so that upon forward movement of the housing 44 to the left, as viewed in Figure 3, and preliminary to cutting, the plate 74 will be rotated in a clockwise direction thereby rotating the ratchet member 77 a quarter of a revolution and causing rotation of the shaft 61 a predetermined fraction of a revolution through the change gears 85, 86, 87, 88 and shaft 73.

Since the circular pitch varies with the pitch diameter of a gear and the number of teeth, it is apparent that the angular movement to be imparted to the work spindle will vary as the circular pitch varies and, therefore, change gears have been provided for varying this amount of rotation of the shaft 61 relative to the shaft 73 so that the fixture may be utilized for cutting various sizes of gears. It will be noted from Figure 2 that these gears are on the end of the fixture and an easily removable cover plate 89 is attached to the end of the housing 67 to permit ready access to the gears to effect changes therein. For the sake of convenience a chart may be provided on the cover plate indicating the size of change gears to be used on the various shafts in cutting teeth of various circular pitches.

An index fixture has thus been provided which is capable of angular adjustment in accordance with the bevel of the gear to be cut and which is also adjustable in accordance with the circular pitch of the gear to be cut.

As previously mentioned, the machine may be utilized for cutting teeth on double cone bodies, as well as single cone bodies. Since it is impossible to arrange the second cone surface in a straight line with the first so as to effect the cut in a single reciprocation of the work with respect to the cutter, the spindle carrier of the present machine is made vertically reciprocable and the cut may be considered as divided into two parts in the sense that the cutter is moved along one surface to form the tooth thereon and then along the other surface to continue the tooth therethrough. In the present instance the work is so placed in the machine that during the cutting along one cone surface, the cutter is gradually raised relative to the work and during the cutting of the second surface the cutter is gradually lowered relative to the work.

Figure 5:
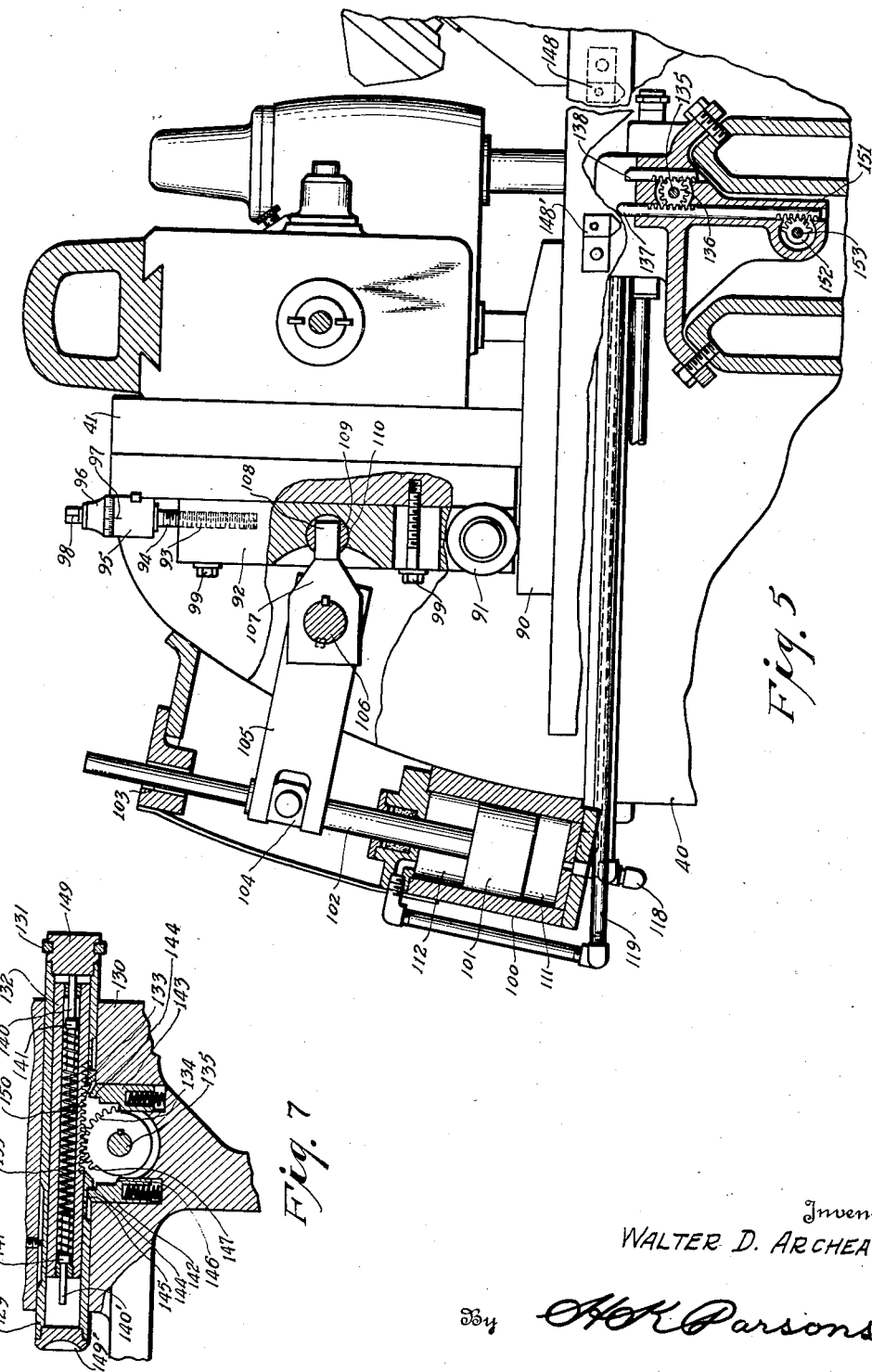
Figure 5 is an elevation partly in section showing the spindle elevating mechanism.

To obtain this movement a cam 90, Figure 5, has been attached to the rear longitudinal side of the table and movable therewith in cooperation with a roller 91 on the carrier. For adjustment purposes the roller 91 is journaled in the end of a bar 92 which has a threaded bore 93 at the upper end for the reception of an adjusting screw 94 journaled in a bracket 95 secured to the carrier. The adjusting screw is rotatable in the bracket but held against longitudinal movement so that upon rotation of the screw the bar 92 will be raised or lowered. To facilitate adjustment a graduated disc 96 may be secured to the upper end of the screw for cooperation with a fixed reference mark 97 formed on the bracket. The upper end of the screw may be squared, as at 98, for the reception of an ordinary removable hand crank. The bar 92 is clamped in position after adjustment by means of lock bolts 99 which are passed through vertical elongated slots in the bar and threaded into the rear of the carrier.

Although the carrier is heavy, it has been found that it is not desirable to depend upon its weight alone to maintain contact between the cam roller and the cam plate, for the reason that during elevation of the carrier the pressure of the roller on the cam is too great causing damage to the cam plate and during lowering of the carrier the friction of the guideways prevents the carrier following closely the decline in the cam surface. For these reasons hydraulic means have been provided for aiding and controlling this movement in both directions. To this end a hydraulic cylinder 100 is attached to the rear of the column 40 having a piston 101 reciprocably mounted therein to which is attached a piston rod 102 extending substantially vertically upward and guided at its upper end in a bearing 103. The piston rod has a cross head 104 secured thereto to which is connected a beam 105 pivoted to a shaft 106 which is journaled in the rear of the column. One arm, 107, of the beam has a reduced cylindrical end 108 to which is attached a ball 109 journaled in a socket 110 formed in the bar 92. The effect of this construction is that upon admittance of pressure to the lower chamber 111 of the cylinder 100 the carrier will be forced downward against the cam plate 90 and upon the admittance of pressure to the upper chamber 112 the carrier will be elevated as when withdrawing the cutters from the work at the end of the cut.

In the operation of the machine, a downward pressure should be maintained on the carrier during movement of the table to the left and at the completion of the cut the carrier should be immediately elevated to remove the cutters from contact with the work so that there will be no interference while the table is being returned toward the right to a starting position and indexed. To synchronize the movements between the carrier and the work table, dog controlled means have been provided whereby the pressure in the cylinder is reversed in operative effect at the moment that the cut is completed to remove the cutters from the work and reversed again at the beginning of a cutting stroke to place the cutters in cutting position.

As shown in Figure 6, a pump 113 draws oil from a reservoir 114 through an in-take 115 and discharges through an outlet 116 to a reversing valve 117. A channel 118 extends from the reversing valve to the lower end of the cylinder 100 and a second pipe 119 extends from the reversing valve to the upper end of the cylinder. The valve is provided with a fixed internal sleeve 120 in which is formed a port 121 to which supply pipe 116 is connected. Additional ports 122 and 123 are formed on opposite sides of the in-take port and are connected respectively with the pipes 118 and 119 leading to the cylinder. Additional ports 124 and 125 are formed on opposite ends of the valve which connect with the return line 126 leading to the reservoir. A plunger rod 127 provided with a plurality of spools 128 is slidably mounted in the sleeve 120 for determining the direction of flow from the port 121 to the ports 122 and 123. It should be apparent that if the plunger rod 127 is shifted to the left from the position shown in Figure 6, that pressure will flow from the port 121 to the port 122 and then to the lower side of the cylinder to lower the spindle carrier and that the port 119 will be connected to the exhaust port 125 thereby relieving the fluid pressure in the upper part of the cylinder. Return movement of the piston rod 127 to the position shown in Figure 6, will reverse the direction of flow in these channels causing upward movement of the spindle carrier.

The plunger rod 127 is shifted back and forth by a load and fire mechanism actuated by suitable dogs carried by the table, more particularly shown in Figure 5. The mechanism comprises a sleeve 129, Figure 7, which is reciprocably mounted in a bracket 130 attached to the bed and is movable parallel to the plunger rod 127 and connected thereto by a yoke 131. An inner sleeve 132 is mounted within the outer sleeve for independent relative movement and has formed longitudinally thereof a rack 133 in mesh with a gear segment 134, Figure 5. The gear segment 134 is keyed to a stud shaft 135 which is journaled in the bracket and also has keyed thereon a pinion 136 which meshes with a pair of rack plungers 137 and 138 reciprocably mounted upon opposite sides thereof. Mounted within the sleeve 132 is a spring 139 which surrounds a pair of rods or plungers 140 and 140' having collars 141 and 141' respectively, thereon between which the spring is contained. A pair of spring pressed locking plungers 142 and 143 are reciprocably mounted upon opposite sides of the member 134 and each has a vertical face 144 and a bevel face 145 formed on the upper end thereof. A shoulder 146 is formed on the side of each plunger for engagement with the end face 147 of the last tooth of the gear sector.

The operation of the device is as follows: A dog, such as 148', carried by the table will come into engagement with the plunger 137 depressing the same and causing rotation of the pinion 136 in a counter clockwise direction which will also cause rotation of the gear segment 134 in the same direction. This will cause longitudinal movement of the sleeve 132 to the left causing the end of the plunger 140' to engage the plug 149' in the end of the sleeve 129 effecting compression of the spring 139. This is due to the fact that the sleeve 129 is held against longitudinal movement by engagement of the face 144 of the plunger 143 with the notch 150 formed in the periphery of the outer sleeve. The relative movement of the sleeve 132 with respect to the outer sleeve 129 and the compression of the spring 139 will continue until the end face 147 engages the shoulder 146 on the plunger 143. Continued movement will then withdraw the plunger 142 permitting the spring and plunger to fire the sleeve 129 to the left and simultaneously shift the reversing valve 127 changing the direction of flow to the cylinder 100. A second dog 148 may be attached to the table to engage the plunger 138 at the proper time to shift the valve in the opposite direction.

Since the dogs 148 and 148' are attached to the rear side of the table, means have been provided to facilitate manual operation of the valve from the front of the machine by extending the plunger 137 downward and providing a rack portion 151 on the lower end thereof which engages with a pinion 152 keyed to the end of a horizontal shaft 153 journaled in the bed and extending to the front of the machine. A suitable handle 154 may be provided on the end of the shaft 153 for manual operation thereof.

It should now be apparent that by properly positioning the dogs 148 and 148' on the rear side of the table for cooperation with the plungers 137 and 138 that the spindle carrier may be moved up or down at proper times to move the cutters in or out of the cut in accordance with the position of the reciprocating table.

In addition to this direct up or down movement, the spindle carrier also has an up and down movement which is controlled by the cam 90 and which is effected while pressure is constantly maintained in chamber 111 of cylinder 100. This movement is necessary in order that the cutters will follow the contour of the work, as well as varying the depth of cut.

When the spindle carrier is in a downward position with the roller 91 in contact with the cam 90 and pressure is in the chamber 111, it will be apparent that any rise on the cam 90 must overcome the weight of the spindle carrier, friction of the guideways plus the pressure in the cylinder to effect elevation of the cutters; while the fall portion on the cam 90 will, as a practical matter, only have to absorb the pressure of the cylinder. It will therefore, be seen if a constant pressure is maintained in the chamber 111 that a greater burden will be placed on the rise surfaces of the cam than upon the fall surfaces thereof. To equalize conditions so that the same pressure will be on both surfaces and still maintain a constant pressure in the chamber 111 a hydraulic counterbalance has been provided which is coupled with the cylinder 100 by means of a differential valve mechanism, as shown in Figure 6.

The counterbalance comprises a cylinder 155 which is fixed in the column 40 and has a piston 156 reciprocably mounted therein connected to the carrier 41 by means of a piston rod 157. The lower end of the cylinder has an inlet 158 which is connected to a bore 159 formed in the differential valve housing 160 by a pipe 161. The upper end of the cylinder is provided with a drain pipe 162 which prevents a vacuum forming in the upper end of the cylinder and also serves to drain leakage fluid back to the reservoir.

Fluid pressure is supplied to the counterbalance cylinder 155 from the booster pump 19 which, as previously explained, supplies fluid to the channel 21. A channel 163 conducts the pressure fluid from the booster pump to a port 164 formed in the differential valve housing which communicates with an annular groove 165 formed in a fixed sleeve 166 and communication is established between the annular groove and the interior of the sleeve by means of radial bores 167. A valve plunger 168 is reciprocably mounted in the sleeve and has an intermediate reduced portion 169 by means of which the radial bores 167 are connected to the radial bores 170 leading to the annular groove 171 which is in constant communication with the longitudinal bore 159. In the position of the parts shown in Figure 6 it will be seen that the pressure from the pump flows to the port 164 and then, by means of the annular groove 165 and radial bore 167, to the interior of the sleeve where the fluid is directed by the reduced portion 169 to the radial bore 170 and groove 171 to the bore 159 which communicates with the lower end of the counterbalance cylinder by means of pipe 161. The pressure in the bore 159 is conducted by means of the radial port 172 to the under-side of the valve plunger 168 tending to lift that plunger against the compression of a spring 173 interposed between a shoulder on the valve plunger and an adjustable plug 174 threaded into the upper end of the valve body. By adjusting this plug any desirable pressure for the counterbalancing cylinder may be predetermined and if this pressure is exceeded the fluid in the chamber 175 will cause the valve plunger to lift and gradually close off the inlet port 164 and then gradualy open the exhaust port 164'.

From this it will be seen that a suitable counterbalancing pressure may be exerted on the under-side of the spindle carrier tending to lift the same against the downward pressure caused by the weight of the carrier and the pressure in the cylinder 100. This upward pressure, of course, will be less than the combined pressures caused by the weight of the carrier and the cylinder 100 and the difference between the two will represent the resultant pressure of the roller 91 on the cam 90.

In the absence of anything further it will be seen that this resultant pressure will be the same whether the carrier is being raised or lowered and it is therefore, necessary to provide means whereby this counterbalancing pressure is greater during lifting of the carrier than during downward movement of the same. This is accomplished by providing a variable pressure control cam 233 which is attached to the side of the table in a position to engage the pawl end 234 of a pivoted lever 235, the other end of which engages the plug 174 which is threaded in a slidable sleeve 236. This control cam is so positioned that as the roller 91 reaches a rise on the cam 90, the pawl end of the lever 235 will be simultaneously raised increasing the compression of the spring 173 resulting in greater pressure necessary in chamber 175 to lift the plunger 168 against it. This permits the pressure in the counterweight cylinder to be increased which reduces the resultant downward pressure on the cam 90.

This increase in pressure is communicated to the lower end of the cylinder 186 of a second valve plunger 176 through channel 187. This plunger 176 is reciprocably mounted in a valve sleeve 177 formed in the housing 160. The channel 113 leading to the chamber 111 is connected to a port 178 in the sleeve 177 by means of a channel 179. An outlet port 180 is also formed in the sleeve 177 and has a pipe 181 connected therewith which leads to the reservoir 114. A tapered reduced portion 182 is formed intermediate the length of the valve plunger 176 and a spring 183 interposed between a shoulder on the valve plunger and a plug 184 threaded in the valve body tends to maintain the valve plunger in a downward position sufficient to normally close off the port 178.

The lower end of the valve plunger is reduced in diameter forming a piston 185 slidable in a cylinder 186. This cylinder is in constant communication with the chamber 175 by means of a cross channel 187. The effect of this is that the pressure in the counterbalancing cylinder is always acting to lift the valve plunger 176 against the compression of the spring 183. As the pressure rises in the counterbalancing cylinder, due to the increase in compression of spring 173, the valve plunger 176 will lift slightly to permit fluid to drain from the cylinder 100 through channel 179 and return line 181 to the reservoir thereby lowering the pressure in the chamber 111. This in turn will reduce the pressure in the counterweight cylinder permitting the valve plungers 168 and 176 to drop thereby again establishing flow to the counterweight cylinder and closing off leakage from the cylinder 100. In this manner by successive movements of these two valve plungers the pressure in each of these cylinders will be maintained at a proper differential so that the pressure of the cam roller on the cam 90 will be maintained constant.

Means have also been provided for stopping the machine automatically after the desired number of teeth have been cut on the work piece. This stoppage may take place after any predetermined number of teeth have been cut irrespective of whether a complete gear has been cut or only a segmental portion thereof, as when cutting mutilated gears in the form of gear segments. This comprises a sort of counting mechanism which is mounted in a housing 188 secured to the end of the table, as shown in Figure 1, and reciprocable therewith. The mechanism is such that it may be pre-set to any number up to the limit of the device and after cutting that number of teeth the machine will be automatically stopped.

Mounted within the housing 188 is a ratchet wheel 189 which is keyed to one end of a shaft 190, the ratchet wheel having a hub 191 by means of which it is journaled in the end wall of the housing. A ratchet pawl 192 is pivotally mounted on a reciprocating plunger 193 and a spring 194 normally maintains the pawl into engagement with the ratchet wheel. The ratchet plungment 193 is moved upward at the end of each return movement of the table by a cam 195 secured to the bed of the machine and in the longitudinal path of movement of the plunger. As the table moves forward on the cutting stroke a spring 196 interposed between the top of the plunger 193 and a plug 197 threaded in the housing, causes the ratchet plunger to move downward sufficient for the pawl to engage the next tooth. A locking pawl 198 is pivotally mounted in the lower part of the housing and a spring 199 maintains this pawl in engagement with the ratchet teeth to prevent backward movement of the ratchet wheel during downward movement of the ratchet plunger. Longitudinally spaced from the ratchet wheel on the shaft 190 and keyed thereto is a radial arm 200 which is rotatable with the ratchet wheel. A notched disc 201 is mounted for free rotation on the shaft 190 and is provided on one face with a stop lug 202. The disc 201 has a hub 203 which projects beyond the housing 188 for receiving a graduated dial 204 which is secured to the projecting end by a set screw 205. A pin 206 is mounted in the housing and projects into an annular groove 207 formed in one face of the disc 201 and a second pin is secured in the disc 201 passing through the lug, as shown in Figure 11, and having one end also projecting into the groove 207. The pin 206 acts as a stop to limit the movement of the disc 201. A spiral spring 208 has one end secured, as by a pin 209, to the housing 188 and the other end secured, as by a pin 210, to the ratchet wheel 189. It will be noted from Figure 10 that the ratchet wheel has a lug 211 integrally formed on one face, and from Figure 9 it will be seen that this lug is in the same radial plane as the arm 200 although they are upon opposite sides of an intermediate plate 212. The effect of the spring is to rotate the ratchet wheel 189 in a clockwise direction when both the pawls 192 and 198 are out of engagement therewith, as shown in Figure 10, until the arm 200 engages the stop lug 202.

From this it will be seen that when the ratchet pawl 192 is in engagement with the ratchet wheel it causes it to rotate in a counter clockwise direction until the lug 211 thereon engages a lug 213 formed integral with the plate 212. The cam control plate 212 is provided with two detent notches 214 and 215. A spring pressed detent 216 is in engagement with the notch 214 at the time that engagement with the ratchet wheel approaches the lug 211. The next ratchet movement of one tooth space will move the disc 212, which is mounted for free rotation of the shaft 190, a sufficient amount to cause the detent plunger 216 to ride over the peak between the two notches and complete the movement. As shown in Figure 9, the plate 212 is provided with a cam surface 217 which engages the pawl 192 and the cam surface 218 which engages the pawl 198 and thus both pawls are moved out of engagement with the ratchet wheel. This permits the spring 208 to come into action and rotate the ratchet wheel and the arm 200 in a counter clockwise direction until the arm 200 abuts the stop lug 202.

Since the final position of the arm 200 and the lug 211 of the ratchet wheel is in the position shown in Figure 9, it will be seen that counter clockwise adjustment of the stop lug 202 will determine the number of times that the ratchet wheel must be engaged by the ratchet pawl 192 to move it from the stop lug 202 to the final position shown in Figure 9. In other words, the stop lug 202 represents the starting position which is variable and the position of the lever 200, as shown in Figure 9, is the final position which does not change. The dial 204 may thus be graduated to indicate the position of the stop lug and the number of ratchet movements necessary to move the ratchet wheel to such a position that it will rotate the disc 202 and throw out the pawls 192 and 198. To maintain the lug 202 in any predetermined position a wedge pointed plunger 219 is slidably mounted in the housing and adapted to engage the teeth 220 formed in the periphery of the disc 201 and held in engagement therewith by means of a set screw 221 and a lock nut 222.

The plate 212 has an additional cam surface 223 adapted to engage the end of a plunger 224 slidably mounted in a slot in the housing and engaging a pivoted lever 225 which has an oppositely extending arm 226 engaging a groove in a shifter rod 227. This shifter rod is slidably mounted on the longitudinal edge of the table and is pivotally connected at the other end with a latch dog 228. Movement of the plunger 224 in an outward radial direction will cause oscillation of the lever 225 and arm 226 in a clockwise direction causing movement of the shifter rod 227 to the right, as viewed in Figure 1, thereby moving the latch dog 228 in a clockwise direction and into a position where it will engage the stop plunger 37, shown in Figure 6.

From the previous description of the stop plunger it will be seen that engagement of the latch dog 228 with the plunger 37 will cause downward movement of the plunger which, in turn, will cause the stop valve to shift to a stop position. With the table thus stopped and the parts in the position shown in Figure 9, it will be seen that both of the pawls are held out of engagement with the ratchet wheel and that the spring has returned the ratchet wheel so that the arm 200 is in engagement with the stop lug 202.

In order to permit operation of the device upon the next work piece it is necessary that the plate 212 be rotated in a counter clockwise direction so that the pawls 192 and 198 will re-engage the ratchet wheel to start the counting operation again and this is accomplished by means of a plunger 229 which is mounted in the housing 188 adjacent the periphery of the plate 212 in engagement with a notch 230 formed in the periphery thereof. A spring 231 tends to maintain the plunger in an upward position but the detent 216 prevents clockwise movement of the plate 212. Therefore, a second cam surface 232 is provided on the bed of the machine to engage the lower end of the plunger 229 as the table is again started upon its next cycle by operation of the starting lever 31 by the operator. A spring 233 will cause the latch dog to return to its normal inoperative position.

It should therefore, be apparent that the table is automatically stopped after cutting a predetermined number of teeth and that the counting mechanism automatically re-sets itself after cutting the last tooth and is again put into operation by the simple starting of the machine and without any attention on the part of the operator.

From the foregoing it should now be apparent that a gear cutting machine has been provided which is capable of cutting teeth on either single cone or double cone bodies and that a differential mechanism has been provided for equalizing the pressure on the cam controlled surfaces while cutting double cone bodies and, in addition, a counting mechanism has been provided which will automatically stop the machine upon the completion of a predetermined number of teeth and which is so designed as to automatically re-set itself to repeat the operation without attention on the part of the operator.

That which is claimed is:

1. A gear cutting machine having a column, a spindle carrier reciprocably mounted on the column, a spindle journaled in the carrier for effecting rotation of a cutter carried thereby, a work support mounted for relative movement with respect to the cutter spindle, means to support a contoured body on the table, cam means for effecting vertical movement of the carrier relative to the table to cause the cutter to follow the contour of the work, and separate auxiliary hydraulic means acting in opposition to one another to control the resultant pressure of the carrier on said cam means.

2. A gear cutting machine comprising a horizontally reciprocating table, a vertically reciprocating spindle carrier, a rotating cutter journaled in said carrier, means to support a two cone body on the table, hydraulic means for reciprocating the table, a cam and roller interposed between the table and carrier for effecting vertical movement of the cutter in timed relation with the reciprocation of the table to form a continuous tooth in the body, opposed hydraulically actuated means for controlling the pressure between the cam and roller including a hydraulically actuated beam operatively connected to the spindle carrier for creating pressure between the cam and roller, and a hydraulic counterweight attached to the carrier for diminishing said pressure.

3. A gear cutting machine comprising a column, a spindle carrier vertically movable on said column, a table mounted for horizontal reciprocation relative to the carrier, a spindle journaled in the carrier having a cutter attached thereto, means carried by the work support for supporting a two cone work blank, a cam and roller, one of which is attached to the work table for effecting vertical movement of the carrier in timed relation with the horizontal movement of the table to cause the cutter to follow the contour of the work, hydraulically actuated means for maintaining the roller in pressure contact with the cam, a hydraulic counterweight for opposing said pressure, and a differential valve to control both of said hydraulic means whereby an even pressure will be maintained between the roller and cam.

4. A milling machine having a reciprocating tool carrier and a work support movable at right angles to the movement of said carrier, means to mount a contoured body on the work support, cam means carried by the table having rise and fall portions thereon for raising and lowering the carrier in timed relation with the reciprocation of the work support, independent hydraulic pressure means acting in opposed relation on the carrier the resultant of which is in a downward direction, a differential valve for controlling the opposing pressures and thereby their resultant, and a second cam carried by the table in proper phased relation with the first cam for actuating said valve to decrease the resultant during rise of the carrier and increase the resultant during fall of the carrier.

5. A gear cutting machine comprising a column, a vertically reciprocating spindle carrier mounted on the column, a work support mounted for transverse movement relative to the movement of the spindle carrier, means to mount a two cone blank on the work support, cam means for controlling the vertical movement of the spindle carrier in timed relation with the reciprocation of the work support, a hydraulically actuated beam pivotally connected to the carrier for moving the carrier into contact with said cam means during the cutting stroke of the work support, a by-pass valve for varying the hydraulic pressure on said beam and a dog controlled reversing valve for changing the direction of hydraulic pressure on the beam and thereby elevating the carrier during a return movement of the table.

6. A gear cutting machine having a column, a spindle carrier reciprocably mounted on the column, a work table mounted for reciprocation relative to the carrier, means to support a two cone body on the table, a cutter rotatably mounted on the spindle carrier, cam means coupled with the carrier for causing the cutter to follow the contour of the work during reciprocation of the table, hydraulically actuated means for moving the spindle carrier into contact with said cam means during the cutting stroke of the table including a piston and a cylinder, a source of fluid pressure therefor, a valve for by-passing part of the fluid to vary the resultant pressure on the piston, a reversing valve interposed between said source and the cylinder, and dog operated means for shifting said valve on the return of the table for lifting the carrier out of contact with said cam means, and additional means for manually operating said valve.

7. A gear cutting machine having a rotating cutter, a work table movable relative thereto, means to attach a work blank on said table, hydraulic means for effecting reciprocation of the table including a stop valve, latch means for holding the valve in running position and operating means for tripping said means to cause movement of said valve to stop the table after a predetermined number of teeth have been cut in the blank.

8. A gear cutting machine having a rotating cutter and a table movable relative thereto, index means carried by the table for supporting a work blank, hydraulic means for effecting reciprocation of the table, means to index the work after each reciprocation, a stop valve normally urged to a closed position, a trip member holding the valve in a running position, and means for automatically operating said trip means to cause shifting of said stop valve after a predetermined number of indexing movements to stop the movement of the table.

9. A gear cutting machine comprising a rotating tooth cutter and a reciprocating table, means to support a work blank on the table, hydraulic means for effecting reciprocation of the table to cut a tooth in said blank including a stop valve, means to index the work after each reciprocation to cut successive teeth therein, means for automatically shifting the valve after a predetermined number of teeth have been cut including a pivoted latch dog, and a ratchet operated control mechanism for moving said latch dog to trip position for subsequently effecting stoppage of the table.

10. A gear cutting machine having a rotating tooth cutter, a reciprocating table, index means to support a work blank on the table, hydraulic means for effecting reciprocation of the table and work blank relative to the cutter to cut a tooth in the blank including a stop valve, an operating plunger therefor, a latch dog for actuating said plunger, resilient means for maintaining said dog in a normal inoperative position, a cam control plate, motion transmitting means between said dog and said plate, and means to rotate said plate to cause tripping of said valve by said dog after a predetermined number of teeth have been cut in the blank.

11. A gear cutting machine having a rotating cutter and a reciprocating table, index means to support a work blank on the table, hydraulic means for effecting reciprocation of the table and indexing of the blank to cut a series of teeth therein including a stop valve, an operating plunger therefor, latch dog mechanism for actuating said plunger, means to maintain said latch dog in normal inoperative position, a cam control plate coupled with said mechanism, a ratchet disc, automatic means for ratcheting said disc a predetermined amount at each reciprocation of the table, and means carried by the disc for actuating said cam control plate after a predetermined number of table reciprocations to thereby move the latch dog to operative position to stop the table.

12. A gear cutting machine having a rotating cutter and a reciprocating table, hydraulic means for effecting reciprocation of the table including a stop valve, trip means carried by the table for actuating said valve, means to hold said trip in a normal inoperative position, and means for moving said trip to an operative position including a cam, a disc having ratchet teeth formed on the periphery thereof, resilient means constantly urging said disc in one direction, a reciprocable pawl actuable upon each reciprocation of the table to ratchet said disc one tooth space in the opposite direction, a locking pawl therefor, and means carried by the disc for actuating said cam and thereby the trip after the predetermined number of said ratchet movements.

13. A gear cutting machine having a rotating cutter and a reciprocating table, hydraulic means for effecting reciprocation of the table including a stop valve, trip means carried by the table for actuating said valve, means to hold said trip in a normal inoperative position, and means for moving said trip to an operative position including a cam, a disc having ratchet teeth formed on the periphery thereof, resilient means constantly urging said disc in one direction, a reciprocable pawl actuable upon each reciprocation of the table to ratchet said disc one tooth space in the opposite direction, a locking pawl therefor, means carried by the disc for actuating said cam and thereby the trip after a predetermined number of ratchet movements, and means carried by the cam for releasing said pawls to permit return of the disc to starting position under action of the spring.

14. A gear cutting machine having a rotating cutter and a reciprocating table, hydraulic means for effecting reciprocation of the table including a stop valve, trip means carried by the table for actuating said valve, means to hold said trip in a normal inoperative position, and means for moving said trip to an operative position including a cam, a disc having ratchet teeth formed on the periphery thereof, resilient means constantly urging said disc in one direction, a reciprocable pawl actuable upon each reciprocation of the table to ratchet said disc one tooth space in the opposite direction, a locking pawl therefor, means carried by the disc for actuating said cam and thereby the trip after a predetermined number of ratchet movements, means carried by the cam for releasing said pawls to permit return of the disc to starting position under action of the spring, and adjustable stop means for determining said starting position whereby the number of reciprocations of the table, before automatically stopping, may be varied.

15. A gear cutting machine having a rotating cutter and a reciprocating table, hydraulic means for effecting reciprocation of the table including a stop valve, trip means carried by the table for actuating said valve, means to hold said trip in a normal inoperative position, and means for moving said trip to an operative position including a cam, a disc having ratchet teeth formed on the periphery thereof, resilient means constantly urging said disc in one direction, a reciprocable pawl actuable upon each reciprocation of the table to ratchet said disc one tooth space in the opposite direction, a locking pawl therefor, means carried by the disc for actuating said cam and thereby the trip after a predetermined number of ratchet movements, means carried by the cam for releasing said pawls to permit return of the disc to starting position under action of the spring, adjustable stop means for determining said starting position, and a dial associated therewith for indicating the number of reciprocations the table will make before stopping.

16. A gear cutting machine having a rotating cutter and a reciprocating table, hydraulic means for effecting reciprocation of the table including a stop valve, trip means carried by the table for actuating said valve, said trip means having an operative and an inoperative position, means for moving said trip to an operative position including a control cam, motion transmitting connections between the cam and trip, counter mechanism for oscillating the cam in one direction after a predetermined number of reciprocations of the table to thereby actuate the trip and stop the table, and means to oscillate the cam in a counter direction upon subsequent movement of the table to move the trip to an inoperative position.

17. A gear cutting machine having a rotating cutter and a reciprocating table, hydraulic means for effecting reciprocation of the table including a stop valve, trip means carried by the table for actuating said valve, said trip means having an operative and an inoperative position, means for moving said trip to an operative position including a control cam, motion transmitting connections between the cam and trip, counter mechanism for oscillating the cam in one direction after a predetermined number of reciprocations of the table to thereby actuate the trip and stop the table, manual means for actuating said stop valve to initiate subsequent movement of the table, and means to oscillate the cam in a counter direction upon subsequent movement of the table to move the trip to an inoperative position.

18. A gear cutting machine having a column, a spindle carrier reciprocably mounted on the column, a spindle journaled in the carrier for effecting rotation of a cutter carried thereby, a work support for moving a gear blank relative to the cutter spindle, a cam and roller for effecting vertical movement of the carrier relative to the table to cause the cutter to follow the contour of the work blank, oppositely acting means in combination with the cam and roller for maintaining pressure contact therebetween including a plurality of cylinders, pistons in the cylinders operatively connected with the carrier for exerting pressure thereon in opposite directions whereby the resultant of said opposed pressures will urge the roller into contact with the cam, and means to maintain said resultant constant during movement of the carrier in either direction.

19. A machine tool having a reciprocable main slide, an auxiliary slide movable toward and from the main slide for relatively positioning a cutter with respect to a work piece, means to control said position including a contoured member and a roller, said roller being attached to one slide and the contoured member to the other slide, oppositely acting hydraulic pressure means the resultant of which acts to maintain contact between the roller and contoured member, control means for maintaining the resultant pressure constant during movement of the main slide in one direction, and means to reverse the effective direction of one of said pressure means whereby both will act in the same direction to effect complete separation of the roller from the contoured member, and thereby separation between the cutter and work.

20. A machine tool having a reciprocable main slide, an auxiliary slide movable toward and from the main slide for relatively positioning a cutter with respect to a work piece, means to control said position including a contoured member and a roller, said roller being attached to one slide and the contoured member to the other slide, oppositely acting hydraulic pressure means the resultant of which acts to maintain contact between the roller and contoured member, control means for maintaining the resultant pressure constant during movement of the main slide in one direction, and trip controlled means operable by the main slide for reversing the direction of one of said pressure means in timed relation to the reciprocation of the main slide whereby both of said means will act in the same direction to effect retraction of the auxiliary slide and thereby separation of the cutter from the work.

21. A milling machine having a reciprocable main slide, an auxiliary slide movable toward and from the main slide to position a cutter relative to a work piece, cam means carried by one of said slides and effective during reciprocation of the main slide to effect a gradual approach and retraction of the auxiliary slide in alternate cycles, a roller carried by one of said slides for contacting said cam, opposed pressure actuated devices for maintaining a resultant pressure between the cam and roller, pressure control mechanism for said devices, means on one slide effective on the control mechanism to vary the pressure exerted by said control devices whereby the resultant pressure will be greater during movement of the auxiliary slide in one direction than in the other, the assistance of the weight of the auxiliary slide during downward movement thereof equalizing the pressure between cam and roller so that it will be the same during either upward or downward movement of the auxiliary slide.

22. A gear cutting machine comprising a horizontally reciprocable table, a vertical reciprocable spindle carrier, a rotatable cutter journaled in said carrier, means to support a work piece on the table, hydraulic means for reciprocating the table, a cam and roller interposed between the table and carrier for determining the depth of cut, one of said parts being attached to the carrier and the other to the table, hydraulically actuated means for moving the carrier toward the table and thereby effecting and maintaining a pressure engagement between the roller and cam, a hydraulic counterbalance attached to the carrier for varying the amount of pressure and means to effect adjustment between the carrier and its actuating means to vary the depth of cut.

23. A gear cutting machine comprising a work table and spindle carrier movable in directions normal to one another, a rotatable cutter journaled in said carrier, means to support a two-cone body on the work table, hydraulic means for advancing the table on a cutting stroke and returning the table on a non-cutting stroke, a cam and roller, one of which is attached to the table and the other to the carrier for limiting the movement of the cutter toward the table and thereby determining the depth of cut, hydraulically actuable means for maintaining pressure engagement between the roller and cam, said cam having rise and fall portions thereon, a differential valve automatically actuable for reducing said pressure during upward movement of the cutter by the rise portion on the cam and increasing the pressure during downward movement of the cutter permitted by the fall portion on the cam, and an additional control valve for said hydraulically actuable means operable simultaneously with reversal of the table to effect separation of the cam and roller and thereby withdrawal of the cutter from engagement with the work during return movement of the table.

24. A gear cutting machine having a column, a spindle carrier reciprocably mounted on the column, a cutter spindle journaled in the carrier for effecting rotation of a cutter carried thereby, a work support mounted for relative movement with respect to the cutter spindle, means to support a contoured body on the table, cam means for effecting upward and downward movement of the carrier relative to the table to cause the cutter to follow a path corresponding to the contour of the work, and separate auxiliary hydraulic means acting in opposition to one another to maintain a predetermined resultant pressure of the carrier on said cam means during upward movement thereof, said hydraulic means including a valve automatically operable upon reversal in the direction of movement of the cutter to increase the resultant pressure of the cutter on said cam means.

25. A machine tool having a horizontal reciprocal work table, a spindle carrier having a cutter journaled therein, movable toward and from the table, a cam for controlling the movement of the cutter during reciprocation of the table whereby the cutter may be caused to travel an irregular path, hydraulic means for effecting reciprocation of the table, including a piston and cylinder one of which is attached to the table, a pump having intake and delivery ports, means coupling said ports to the opposite ends of the cylinder to determine the direction of movement of the table, means for maintaining pressure engagement between the spindle carrier and cam, a hydraulic counterbalancing cylinder for controlling said pressure, channel means coupled to the delivery port of said pump for delivering the fluid to the counterbalancing cylinder and an automatic control valve for maintaining a predetermined pressure in the counterbalancing cylinder regardless of the pressure at the delivery port of said pump.

26. A machine tool having a horizontally reciprocable work table, a spindle carrier having a cutter journaled therein, movable toward and from the table, a cam for controlling the movement of the cutter during reciprocation of the table whereby the cutter may be caused to travel an irregular path, hydraulic means for effecting reciprocation of the table, including a piston and cylinder one of which is attached to the table, a pump having intake and delivery ports, means coupling said ports to the opposite ends of the cylinder to determine the direction of movement of the table, means for maintaining pressure engagement between the spindle carrier and cam, a hydraulic counterbalancing cylinder for controlling said pressure, channel means coupled to the delivery port of said pump for conducting fluid to the counterbalancing cylinder, an automatic control valve for maintaining a predetermined pressure in the counterbaling cylinder regardless of the pressure at the delivery port of said pump, and means trip actuable by the table for automatically changing the setting of said automatic control valve, whereby a higher pressure will be maintained in the counterbalancing cylinder during upward movement of the cutter than during downward movement thereof.

27. A machine tool having a reciprocable table, an adjustable spindle carrier having a cutter journaled therein, movable toward and from the table, a cam for limiting the movement of the carrier toward the table, said cam adapted to be contoured in accordance with the irregular contour of a work piece, a piston and cylinder, one of which is operatively connected to the carrier for maintaining pressure contact between the carrier and cam, a hydraulic circuit for controlling reciprocation of the table including a piston and cylinder, one of which is connected to the table, a variable delivery pump having intake and delivery ports, channel means including a reversing valve for coupling the ports to opposite ends of the cylinder, an additional piston and cylinder, one of which is connected to the carrier for controlling the pressure of the carrier on said cam means, a conduit coupled to the delivery port of said pump for supplying fluid pressure to the last named cylinder, a differential control valve in said conduit having a setting for establishing a predetermined pressure in the last named cylinder regardless of the pressure at the delivery port of said pump, means actuable by the table for changing the setting of said differential valve upon upward movement of the carrier to increase the pressure in said conduit and means responsive to the higher pressure in said conduit to reduce the pressure in the first named piston and cylinder.

28. A machine tool having a reciprocable table, an adjustable spindle carrier having a cutter journaled therein, movable toward and from the table, a cam for limiting the movement of the carrier toward the table, said cam adapted to be contoured in accordance with the irregular contour of a work piece, a piston and cylinder, one of which is operatively connected to the carrier for maintaining pressure contact between the carrier and cam, a hydraulic circuit for controlling reciprocation of the table including a piston and cylinder, one of which is connected to the table, a variable delivery pump having intake and delivery ports, channel means including a reversing valve for coupling the ports to opposite ends of the cylinder, an additional piston and cylinder, one of which is connected to the carrier for controlling the pressure of the carrier on said cam means, a conduit coupled to the delivery port of said pump for supplying fluid pressure to the last named cylinder, a differential control valve in said conduit having a setting for establishing a predetermined pressure in the last named cylinder regardless of the pressure at the delivery port of said pump, means actuable by the table for changing the setting of said differential valve upon upward movement of the carrier to increase the pressure in said conduit, means responsive to the higher pressure in said conduit to reduce the pressure in the first named piston and cylinder, said last named means including a valve having a plunger, a port connected to the first named cylinder, and an exhaust port, and resilient means for normally maintaining the plunger in a position to prevent flow between said ports and yieldable under influence of the higher pressure in said conduit to effect connection between said ports and permit a limited by-pass of fluid to reservoir.

WALTER D. ARCHEA.